United States Patent [19]

Booth

[11] Patent Number: 5,150,779
[45] Date of Patent: Sep. 29, 1992

[54] ARMATURE ASSEMBLY FOR AN ELECTROMAGNETIC COUPLING

[75] Inventor: Dwight E. Booth, Janesville, Wis.

[73] Assignee: Dana Corporation, Toledo, Ohio

[21] Appl. No.: 820,344

[22] Filed: Jan. 14, 1992

[51] Int. Cl.$^5$ ............................................. F16D 27/07
[52] U.S. Cl. ................................. 192/106.1; 192/84 C
[58] Field of Search ........................... 192/84 C, 106.1

[56] References Cited

U.S. PATENT DOCUMENTS

| | | | |
|---|---|---|---|
| 3,205,989 | 9/1965 | Mantey | 192/84 C |
| 3,425,529 | 2/1969 | Hayashi | 192/84 C X |
| 3,455,421 | 7/1969 | Miller | 192/84 C X |
| 3,565,223 | 2/1971 | Pierce | 192/84 C |
| 3,774,739 | 11/1973 | Higuchi | 192/106.1 X |
| 4,160,498 | 7/1979 | Newton et al. | 192/84 C |
| 4,432,446 | 2/1984 | Okano et al. | 192/84 C |
| 4,445,606 | 5/1984 | Van Laningham | 192/106.1 |
| 4,493,407 | 1/1985 | Newton | 192/84 C |
| 4,860,867 | 8/1989 | Nighimura | 192/106.1 X |
| 5,036,964 | 8/1991 | Booth et al. | 192/84 C |

Primary Examiner—Leslie A. Braun
Assistant Examiner—Nicholas Whitelaw
Attorney, Agent, or Firm—Leydig, Voit & Mayer

[57] ABSTRACT

An armature disc is attached to a resilient plastic spider by angularly spaced rivets. To prevent the spider from striking the disc and creating a buzzing noise, spacer pads are formed integrally with the spider adjacent the rivets and establish an axial gap of substantial width between the disc and the spider along arcs located between the rivets. The heads of the rivets are located in countersunk holes in the spider and pull axially through the plastic of the spider to release the armature disc from the spider if the spider becomes excessively hot as a result of slippage of the coupling. A metal washer on the hub of the coupling prevents the hot disc, when released, from dropping onto and melting a central sleeve portion of the spider.

17 Claims, 1 Drawing Sheet

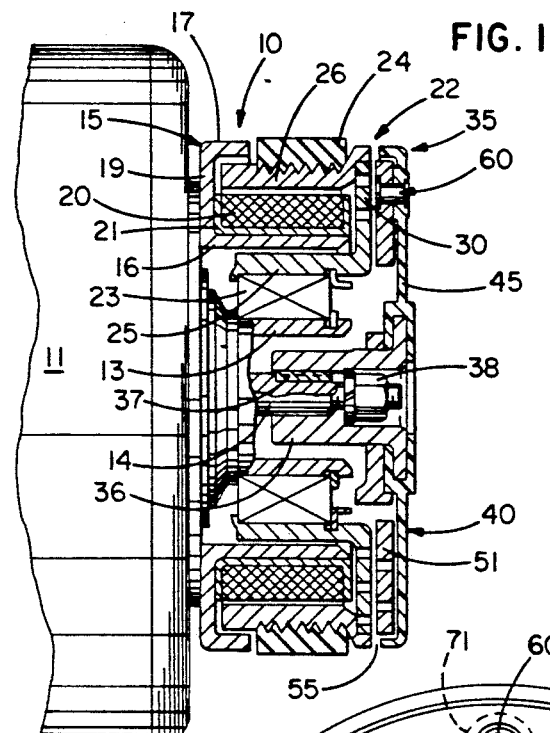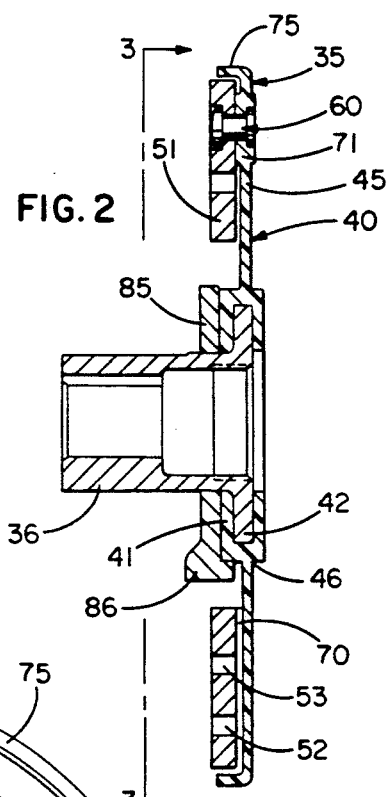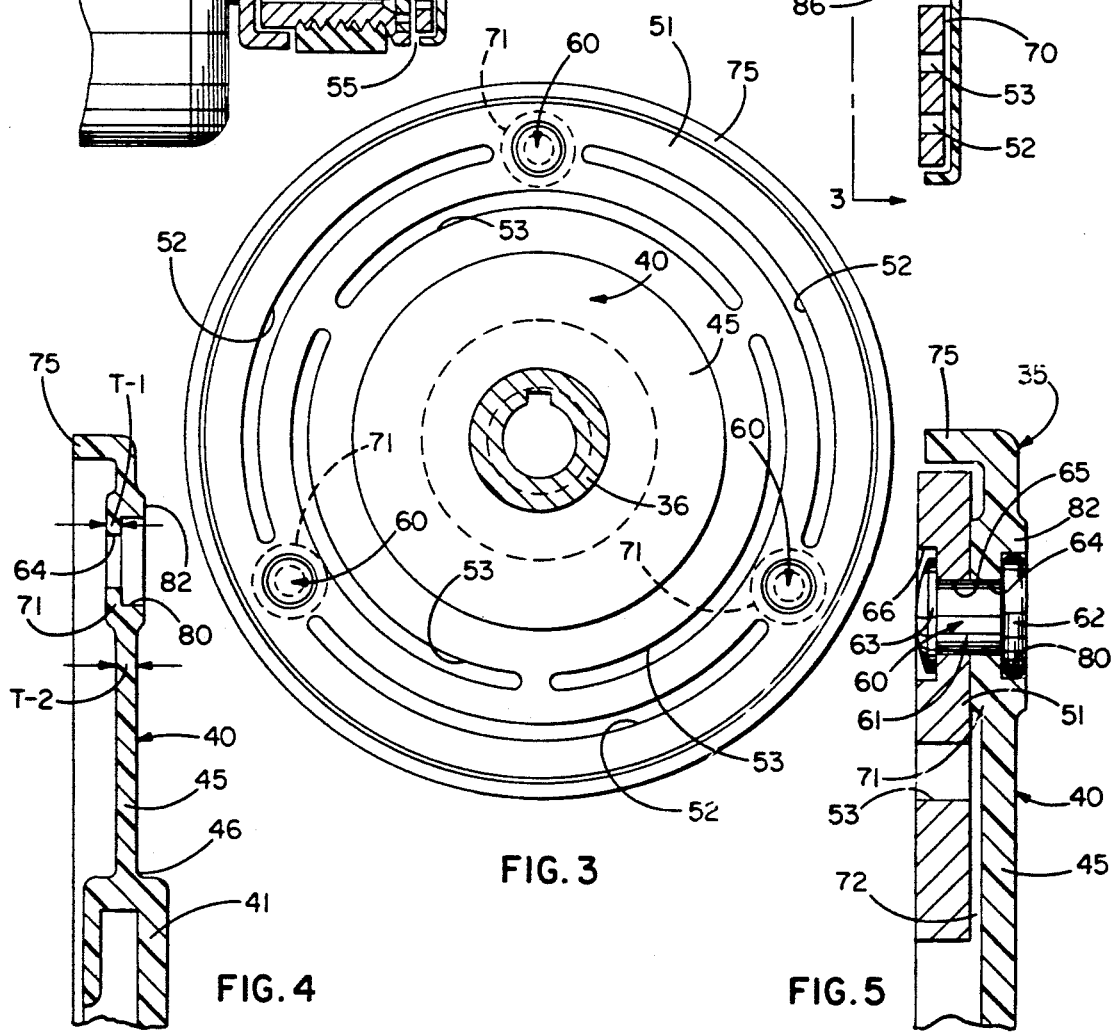

ARMATURE ASSEMBLY FOR AN ELECTROMAGNETIC COUPLING

BACKGROUND OF THE INVENTION

This invention relates generally to an electromagnetic coupling such as a clutch or brake and, more particularly, to an armature assembly for such a coupling.

Booth et al U.S. Pat. No. 5,036,964 discloses an electromagnetic clutch in which an armature is connected to a driven hub and is adapted to be frictionally coupled to a driving rotor when an electromagnet is energized to engage the clutch. When the clutch is engaged, the rotor acts through the armature to rotate the driven hub.

The armature assembly disclosed in the Booth et al patent includes a resiliently yieldable web which acts to connect a low magnetic reluctance armature disc for rotation with the driven hub. The web flexes axially in the manner of a living hinge in order to permit the armature disc to move toward and away from the rotor when the clutch is engaged and disengaged. In addition, the web yields torsionally to dampen torsional shock which occurs when the clutch is first engaged and to smooth torsional spikes which occur during steady state operation.

In the armature assembly of the Booth et al patent, the web is made of plastic and is formed with axially projecting pins which are heat staked in order to secure the armature disc to the web. In lieu of using such pins, the armature disc may be secured to the web by angularly spaced rivets each having an elongated shank and an enlarged head. The rivets form a better torque transmitting connection between the web and the disc.

When the armature disc is secured to the web by rivets, the disc is clamped against the web at the angularly spaced locations of the rivets. Due to inherent distortion of the web during molding, however, those portions of the disc located between the rivets tend to be spaced axially from the web by a narrow gap having a width typically ranging between 0.010" and 0.030". Such a narrow gap allows the web to strike the armature disc under high frequency axial vibration and, as a result, a buzz-like noise is created between the armature disc and the web.

In armature assemblies of this type, it is important that the components be captivated and prevented from flying dangerously away from the clutch in the event the driven hub locks up and causes the plastic web to be subjected to severe heat during slippage of the clutch. Under such slip and burn conditions, it is safer to allow the armature disc to break free from the web and to be captivated between the web and the rotor rather than to permit the entire armature assembly to melt away from and fly off of the hub.

SUMMARY OF THE INVENTION

One of the aims of the present invention is to provide a new and improved armature assembly of the above general type in which the flexible web and the armature disc are secured together in such a manner as to eliminate the buzz-like noise resulting from high frequency vibration of the components.

A more detailed object of the invention is to achieve the foregoing through the provision of novel integral spacers on the plastic web, the spacers holding the armature disc sufficiently far away from the web as to prevent the web from striking the disc and producing the buzz-like noise.

Another object of the invention is to connect the armature disc to the web with rivets which, under slip and burn conditions, tear axially through the web to release the armature disc from the web and cause the disc to be safely trapped between the web and the rotor.

Still a further object is to protect the hub area of the web against being melted away by the hot armature disc when the disc is released from the web under slip and burn conditions.

These and other objects and advantages of the invention will become more apparent from the following detailed description when taken in conjunction with the accompanying drawings.

BRIEF DESCRIPTION OF THE DRAWINGS

FIG. 1 is a sectional view of a typical electromagnetic coupling equipped with a new and improved armature assembly incorporating the unique features of the present invention.

FIG. 2 is an enlarged sectional view of the armature assembly shown in FIG. 1.

FIG. 3 is a cross-section taken along the line 3-3 of FIG. 2.

FIG. 4 is an enlarged view of a portion of the armature assembly illustrated in FIG. 2 but shows the web without the armature disc.

FIG. 5 also is an enlarged view of the armature assembly illustrated in FIG. 2 and shows the armature disc attached to the web.

DETAILED DESCRIPTION OF THE PREFERRED EMBODIMENTS

For purposes of illustration, the present invention is shown in connection with an electromagnetic coupling 10 which could be a brake but which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of magnetic material, the inner pole piece being secured to the outer race of the bearing. Several axially spaced grooves extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al patent.

Connected to and extending between the pole pieces 25 and 26 of the rotor 22 is an axially facing friction face 30 which is circumferentially slotted in a conventional manner so as to define multiple magnetic poles. When the winding 20 is energized, the friction face forms a rotatable magnetic field member.

Located in opposing relation to the rotor face 30 is an armature assembly 35. When the winding 20 is excited, magnetic flux draws part of the armature assembly into frictional engagement with the rotor face 30 so as to couple the armature assembly and the rotor for rotation in unison. Rotation of the armature assembly is transmitted to the shaft 14 in order to drive the compressor 11.

More specifically, the armature assembly 35 includes a tubular hub 36 (FIG. 2) which is preferably but not necessarily made of powdered metal. The hub is telescoped onto the compressor shaft 14, is keyed to the shaft at 37 (FIG. 1) and is clamped in an axially fixed position on the shaft by a nut 38 which is threaded onto the free end portion of the shaft.

The armature assembly 35 includes a spider 40 which is injection molded of resiliently yieldable material such as plastic. A suitable material for the spider is Dupont Zytel ST 801-HS.

As shown in FIG. 2, the spider 40 includes a central sleeve 41 which encircles the forward end portion of the hub 36. The hub preferably is insert molded in place when the spider is molded and thus the plastic of the sleeve is bonded to and encapsulates the outer end portion of the hub. To couple the sleeve and the hub for rotation in unison, the hub is formed with radially extending and angularly spaced lugs 42 (FIG. 2). When the spider is molded, the plastic flows into and fills the space between the lugs and thus prevents relative rotation between the hub and the sleeve. Each lug 42 also defines two shoulders which face in opposite axial directions and which are engaged by the plastic of the sleeve 41 to captivate the sleeve axially on the hub. Reference may be made to the aforementioned Booth et al patent for a more detailed disclosure of the lugs.

The spider includes a web 45 molded integrally with and extending radially from the sleeve 41. The web is preferably circular and is comparatively thin in the axial direction. Because the plastic is flexible, the web 45 is capable of flexing axially relative to the sleeve 41 at a living hinge 46 (FIG. 2) defined at the junction of the web with the sleeve.

In this instance, the armature itself is formed by an annular disc 51 made of low magnetic reluctance material such as AISI 1010 steel. The armature disc 51 is formed with two radially spaced rows 52 and 53 of angularly spaced slots. The slots cause the armature disc 51 to have magnetic poles which coact with the poles of the face 30 of the rotor 22. When the winding 20 is de-energized, a narrow axial air gap 55 (FIG. 1) exists between the pole faces of the rotor and the pole faces of the armature disc. Upon energization of the winding, magnetic flux cuts across the gap 55 to draw the armature disc 51 into frictional engagement with the rotor and thereby couple the armature disc for rotation with the rotor.

Herein, the armature disc 51 is coupled to the outer peripheral portion of the plastic spider 40 by a plurality of angularly spaced rivets 60 (FIGS. 3 and 5) each having an elongated shank 61, an enlarged flat head 62 and a swaged flange 63. In this instance, three equally spaced rivets 60 connect the disc 51 to the spider 40. The shank of each rivet extends through holes 64 and 65 (FIG. 5) in the spider 40 and the disc 51, respectively, while the flange 63 of each rivet is received in an enlarged countersunk hole 66 formed in the rear side of the disc.

At the locations of the three rivets 61, the disc 51 is clamped into tight engagement with the spider 40. Because the spider is made of relatively thin material, however, and tends to distort somewhat, a narrow axial gap exists between the web 45 and the disc 51 along arcs extending between the rivets. When the clutch 10 is engaged, the presence of the narrow gap causes the disc and the web to vibrate against one another and create a buzz-like noise.

In accordance with one aspect of the present invention, the aforementioned noise is eliminated by spacing the disc 51 further away from the web 45 and thereby creating a relatively wide gap 70 (FIG. 2) between the disc and the web along the arcs between the rivets 60. The wide gap 70 improves the acoustical characteristics of the clutch 10 by preventing the disc 51 from striking the web 45 and creating a buzzing noise when the components are subjected to high frequency axial vibration.

Herein, spacing of the disc 51 from the web 45 is effected by molding three angularly spaced pads 71 (FIGS. 3 to 5) integrally with the rear side of the web 45 adjacent the holes 64. The pads project axially rearwardly from the rear side of the web and engage the forward side of the disc 51 at three angularly spaced locations adjacent the outer periphery of the disc. When the rivets 60 are swaged, the outer peripheral portion of the disc 51 is clamped tightly against the pads 71 adjacent the locations of the rivets and, at such locations, the inner peripheral portion of the disc is spaced from the web by a relatively narrow gap 72 (FIG. 5). Along arcs between the rivets where the plastic web tends to distort, the entire disc is spaced axially from the web by the relatively wide gap 70 as a result of the pads engaging the disc. The gap 70 is sufficiently wide as to prevent the web from slapping against the disc and creating the buzzing noise. Moreover, the gap effects better thermal isolation of the disc from the web and reduces heat transfer from the metal disc to the plastic web.

If the compressor shaft 14 should lock up, considerable heat is generated as the rotor 22 slips past the stopped armature assembly 35. If sufficient heat is conducted to the sleeve 41 of the spider 40, the sleeve may melt and tear away from the lugs 42 of the hub 36. This would create a potentially dangerous condition since the entire armature assembly 35 could be propelled away from the clutch 10 with significant force. In order to avoid launching of the armature assembly under a "slip and burn" condition, provision is made to release the armature disc 51 from the web 45. Upon release, the disc 51 becomes axially trapped between the web 45 and the rotor 22 and becomes radially trapped between the hub 36 and an axially extending flange 75 which projects rearwardly from the outer periphery of the web 45, the disc thereby being prevented from flying away from the clutch 10.

In relatively small diameter armature assemblies, there is a comparatively short moment arm between the hub and the rivets and thus torque of a given magnitude causes relatively high angular forces to be imposed on the rivets. When the clutch is in a slip and burn condition, such forces cause the rivets to shear angularly through the softened material of the hot web and actually form a 360 degree circular cut which releases the armature disc from the web and prevents further heat from being conducted to the web.

In larger diameter armature assemblies such as the armature assembly 35 shown herein, the longer moment arm between the hub 36 and the rivets 60 results in torque of a given magnitude producing less angular force on the rivets. When the clutch 10 is in a slip and burn condition, the angular force exerted on the rivets may not be sufficient to cause the rivets to cut a full circle in the web 45. If this occurs, the armature disc 51 remains attached to the web 45 and eventually the heat may melt the sleeve 41 to allow the entire armature assembly 35 to fly loose from the hub 36.

According to another aspect of the present invention, the rivets 60 pull axially through the spider 40 and effect release of the armature disc 51 when the clutch 10 is in a slip and burn condition. As a result, it is not necessary that high angular forces be imposed on the rivets in order to effect release of the armature disc from the spider.

The foregoing is achieved by effectively thinning the material of the spider 40 in the area of the rivets 60 and reducing the material to such thickness that the heads 62 of the rivets may pull axially through the plastic material when the latter is hot and soft. As shown in FIGS. 4 and 5, counterholes 80 which are larger in diameter than the holes 64 are formed in the forward side of the spider 40 and receive the heads 62 of the rivets 60. By virtue of the counterholes, the axial thickness T-1 (FIG. 4) of the material engaged by the head 62 of each rivet is less than the nominal thickness T-2 of the web 45 even in spite of the presence of the spacer pad 71.

When the clutch 10 goes to a slip and burn condition, the plastic spider 40 softens as a result of the heat and, as the rotor 22 slips past and attempts to turn the stopped armature disc 51, angular forces are exerted on the rivets 60 and tend to cause the shanks 61 thereof to slice angularly through short distances in the plastic material. At the same time, the spider 40 tends to flex away from the rotor 22 as a result of the resilient material attempting to pull the armature disc to its released position. By virtue of the forces resulting from such flexure, the heads 62 of the rivets are pulled axially through the thinned material at the bottoms of the counterholes 80 and tear away from the spider 40 so as to release the armature disc 51. The disc becomes trapped between the rotor 22, the hub 36, the web 45 and the flange 75 and thus is prevented from flying out of the clutch. With the disc 51 released from the spider 40, the sleeve 41 is not subjected to extreme heat conducted from the rotor and remains attached to the hub.

Accordingly, the thin material at the bottom of the counterholes 80 permits release of the armature disc 51 even though the rivets 60 are not subjected to high angular forces and even though the spacer pads 71 are present in the area of the rivets. Because a circular cut is not made in the spider 40, the spider remains basically intact so as to effectively trap the armature disc.

The shank 61 of each rivet 60 has substantially the same diameter as the hole 65 in the spider 40 so as to snugly engage the annular wall of the hole and thereby establish a lash-free driving connection between the shank and the spider. In addition, the head 62 of each rivet preferably has substantially the same diameter as the respective counterhole 80 and snugly engages the annular wall of the counterhole. As a result, the rivet head also transmits torque to the spider when the clutch 10 is engaged. To increase the axial length of the bearing surfaces engaged by the rivet heads, bosses 82 (FIGS. 4 and 5) are formed integrally with and project axially from the forward side of the spider 40, the bosses encircling the counterholes 80.

In certain armature assemblies, portions of the sleeve 41 and the armature disc 51 may be disposed in the same radial plane as shown in FIG. 2. If the very hot disc—when released from the spider 40 under slip and burn conditions—drops into engagement with the sleeve, the sleeve may be melted away from the hub 36 to free the entire armature assembly 35 from the hub. To guard against this, a metal collar or washer 85 (FIG. 2) is attached to the hub 36 by a press fit or the like and is located immediately adjacent the rear side of the sleeve 41. The outer diameter of the washer is somewhat greater than the outer diameter of the sleeve and thus the armature disc 51 drops onto the washer and is held out of contact with the sleeve to prevent melting thereof. If desired, a counterweight 86 may be incorporated in a circumferential portion of the washer to balance the compressor shaft 14.

I claim:

1. An armature assembly for a selectively energizable and de-energizable electromagnetic coupling, said armature assembly comprising a hub having a central axis, a sleeve telescoped over said hub and captivated against rotational and axial movement relative to the hub, web means projecting radially from said sleeve and having first and second axially facing sides, said sleeve and said web means being made of resiliently yieldable plastic, living hinge means integral with said sleeve and said web means and permitting said web means to flex axially back and forth relative to said sleeve, an annular armature disc made of low magnetic reluctance material, said armature disc being spaced radially outwardly from said hub and being secured to said first side of said web means, and spacer means integral with and projecting axially from said first side of said web means and engaging said armature disc to hold said disc in axially spaced relation with said web means.

2. An armature assembly as defined in claim 1 in which said spacer means are spaced angularly around said web means and comprise pads projecting axially from said first side of said web means.

3. An armature assembly as defined in claim 2 in which an axially extending hole of predetermined diameter is formed through each of said pads, and a rivet extending through each hole and securing said armature disc to said web means.

4. An armature assembly as defined in claim 3 in which each of said rivets includes a head and a shank, the shanks of said rivets extending through the holes of said pads, and holes of larger diameter formed in the second side of said web means and coaxial with the holes in said pads, the heads of said rivets being received in said larger diameter holes.

5. An armature assembly as defined in claim 4 in which said larger diameter holes cause the thickness of said pads to be less than the thickness of said web means.

6. An armature assembly as defined in claim 4 in which said shank of each rivet is approximately the same diameter as the hole in the respective pad and engages the annular wall of such hole, the head of each rivet being approximately the same diameter as the respective larger diameter hole and engaging the annular wall of such hole.

7. An armature assembly as defined in claim 6 in which angularly spaced bosses are formed integrally with and project axially from the second side of said web means and encircle said larger diameter holes.

8. An armature assembly as defined in claim 1 further including a washer made of metallic material and secured to said hub adjacent said sleeve, portions of said washer and said armature disc being located in the same radial plane, the outer diameter of said washer being larger than the outer diameter of said sleeve and holding said armature disc out of engagement with said sleeve in the event said disc separates from said web means.

9. An armature assembly for a selectively energizable and de-energizable electromagnetic coupling, said armature assembly comprising a hub having a central axis, a sleeve telescoped over said hub and captivated against rotational and axial movement relative to the hub, web means projecting radially from said sleeve and having first and second axially facing sides, said sleeve and said web means being made of resiliently yieldable plastic, living hinge means integral with said sleeve and said web means and permitting said web means to flex axially back and forth relative to said sleeve, an annular armature disc spaced radially outwardly from said hub and made of low magnetic reluctance material, and means for securing said armature disc to said first side of said web means, said securing means comprising a plurality of angularly spaced rivets each having an elongated shank and an enlarged head, angularly spaced holes of predetermined diameter formed in said web means and said armature disc and receiving the shanks of said rivets, holes of larger diameter formed in the second side of said web means and coaxial with said holes of predetermined diameter, the heads of said rivets being received in said larger diameter holes.

10. An armature assembly as defined in claim 9 in which said shank of each rivet is approximately the same diameter as the hole in the respective pad and engages the annular wall of such hole, the head of each rivet being approximately the same diameter as the respective larger diameter hole and engaging the annular wall of such hole.

11. An armature assembly as defined in claim 9 further including spacer means integral with and projecting axially from said first side of said web means and engaging said armature disc to hold said disc in axially spaced relation with said web means.

12. An armature assembly as defined in claim 11 in which said spacer means are spaced angularly around said web means and comprise pads projecting axially from said first side of said web means.

13. An armature assembly as defined in claim 12 in which said holes of predetermined diameter in said web means are formed through said pads.

14. An armature assembly as defined in claim 13 in which angularly spaced bosses are formed integrally with and project axially from said second side of said disc and encircle said holes of larger diameter.

15. An armature assembly as defined in claim 9 further including a washer made of metallic material and secured to said hub adjacent said sleeve, portions of said washer and said armature disc being located in the same radial plane, the outer diameter of said washer being larger than the outer diameter of said sleeve and holding said armature disc out of engagement with said sleeve in the event said disc separates from said web means.

16. An armature assembly for a selectively energizable and de-energizable electromagnetic coupling, said armature assembly comprising a hub having a central axis, a sleeve telescoped over said hub and captivated against rotational and axial movement relative to the hub, web means projecting radially from said sleeve and having first and second axially facing sides, said sleeve and said web means being made of resiliently yieldable plastic, living hinge means integral with said sleeve and said web means and permitting said web means to flex axially back and forth relative to said sleeve, an annular armature disc made of low magnetic reluctance material, means for securing said armature disc to said first side of said web means, a metallic collar joined to said hub adjacent said sleeve, portions of said collar and said armature disc being located in the same radial plane, the outer diameter of said collar being larger than the outer diameter of said sleeve and holding said armature disc out of engagement with said sleeve in the event said disc separates from said web means.

17. An armature assembly as defined in claim 16 in which a counterweight is incorporated in said collar.

* * * * *